United States Patent
Jurisch

(10) Patent No.: US 8,132,240 B2
(45) Date of Patent: Mar. 6, 2012

(54) ELECTRIC FIELD UNIT AND METHOD FOR EXECUTING A PROTECTED FUNCTION OF AN ELECTRIC FIELD UNIT

(75) Inventor: Andreas Jurisch, Schwante (DE)

(73) Assignee: Siemens Aktiengesellschaft, Munich (DE)

( * ) Notice: Subject to any disclaimer, the term of this patent is extended or adjusted under 35 U.S.C. 154(b) by 911 days.

(21) Appl. No.: 12/088,600

(22) PCT Filed: Sep. 29, 2005

(86) PCT No.: PCT/DE2005/001751
§ 371 (c)(1),
(2), (4) Date: Jul. 7, 2008

(87) PCT Pub. No.: WO2007/036178
PCT Pub. Date: Apr. 5, 2007

(65) Prior Publication Data
US 2008/0282332 A1    Nov. 13, 2008

(51) Int. Cl.
*G06F 17/30* (2006.01)
*G06F 9/00* (2006.01)
*G06F 21/00* (2006.01)
*H04L 29/06* (2006.01)
*H04L 9/32* (2006.01)
*H04K 1/00* (2006.01)

(52) U.S. Cl. .............. 726/6; 380/26; 713/100; 713/168; 713/183; 726/27

(58) Field of Classification Search .................. None
See application file for complete search history.

(56) References Cited

U.S. PATENT DOCUMENTS

| | | | |
|---|---|---|---|
| 5,768,119 A | * | 6/1998 | Havekost et al. ................ 700/4 |
| 6,195,591 B1 | * | 2/2001 | Nixon et al. .................... 700/83 |
| 7,069,580 B1 | * | 6/2006 | Deitz et al. ........................ 726/2 |
| RE40,817 E | * | 6/2009 | Krivoshein et al. ............... 700/1 |
| 2002/0144142 A1 | * | 10/2002 | Shohat .......................... 713/200 |
| 2003/0182396 A1 | | 9/2003 | Reich et al. |
| 2004/0107025 A1 | | 6/2004 | Ransom et al. |
| 2005/0172258 A1 | * | 8/2005 | Nixon et al. .................. 717/100 |

FOREIGN PATENT DOCUMENTS
DE    19812424 A1    9/1999
GB    2368701 A      5/2002

OTHER PUBLICATIONS

SIPROTEC 4, Sytembeschreibung, E50417-H1100-C151-A6, Published Jun. 21, 2004 (English translation of relevant pages).

* cited by examiner

*Primary Examiner* — Nasser Moazzami
*Assistant Examiner* — Fatoumata Traore
(74) *Attorney, Agent, or Firm* — Laurence A. Greenberg; Werner H. Stemer; Ralph E. Locher

(57) ABSTRACT

In order to develop a method for carrying out a protected function of an electrical field device in such a manner that a high degree of security against unauthorized accesses to the electrical field device can be ensured irrespective of the nature of the communication link between a user and the electrical field device, an identification device for the electrical field device and a security device are used to check whether a stated protected function of the electrical field device can be carried out, or should be refused. The invention also relates to an appropriately configured electrical field device.

15 Claims, 3 Drawing Sheets

ELECTRIC FIELD UNIT AND METHOD FOR EXECUTING A PROTECTED FUNCTION OF AN ELECTRIC FIELD UNIT

BACKGROUND OF THE INVENTION

Field of the Invention

Electric field units are currently used in many areas of automation engineering. Thus, electric field units can be used, for example, for monitoring and controlling chemical and process engineering processes, industrial production processes or also processes for transmitting and/or distributing electrical energy in electrical energy supply networks. The electric field units are normally located in the vicinity of the process to be automated and there record measurement values describing the process or issue instructions for controlling process components.

Thus, for example, a field unit in an electrical energy supply network can record current and voltage measurement values which specify the instantaneous state of the electrical energy supply network. Furthermore the electric field unit can issue control commands such as, for example, a command for opening or closing a circuit breaker in the electrical energy supply network.

Such field units must normally be protected against unauthorized access. For this purpose, they are arranged, for example, in correspondingly secured areas which can only be accessed by appropriate personnel. Such secured areas can be protected, for example, by doors or barricades; there is frequently also monitoring by camera in order to detect or be able to prevent unauthorized third-party access to the field units as quickly as possible.

To be operated, electric field units usually have an input device such as, for example, a keypad, and a display device such as, e.g. a display. By means of the input device, all functions can be called up directly at the electric field unit. Functions relevant to the security of the automated process can usually be executed only after inputting a corresponding password. Within the last few years, data interfaces were provided on field units in order to simplify their operation, by means of which operation and/or observation of the field units can be carried out locally or remotely. In this context, e.g. the provision of a serial interface as data interface at the electric field unit is normal via which, for example, an external data processing device such as, e.g. a parameterizing laptop can be connected in order to perform parameter adjustments in the electric field unit.

This new capability for operating electric field units remotely results in greatly altered security conditions, however. Whereas it is relatively simple to prevent the access to the field unit as described above, for example by construction measures and corresponding monitoring arrangements in the case of older electric field units without the capability of remote control, the risk of illegal third-party access is distinctly increased in the remote operation of a field unit provided with a corresponding data interface. This risk is again increased distinctly by the introduction of network-capable Ethernet interfaces as data interfaces at the field units since the field units can now be linked by large networks which cannot be completely secured such as, for example, an intranet or even the Internet.

In the system description of SIPROTEC 4 field units by Siemens AG, issue 06.21.04, order No. E50417-H1100-C151-A6, electric field units are found which have an input device in the form of a keypad and a display device in the form of a display (compare, e.g. pp. 20-21 of the system description). Via the keypad, all functions of the electric field unit can be called up. To call up protected functions, a corresponding password must be entered via the input panel (compare, e.g. p. 12 of the system description). The field units also have at their front a so-called operating interface in the form of a serial plug-in connection as data interface. This operating interface can be connected via a serial data transmission cable to an external computer on which operating/observation and/or parameterizing software is running. Using this software, adjustments can be performed in the unit and changed and the unit can be operated and observed.

As can also be seen from the system description mentioned, the units can also be equipped with a data interface in the form of an Ethernet interface which provides for network interworking of the unit. Activating protected functions of the electric field unit is blocked via the Ethernet interface as a standard, but can also be permitted via the user of the field unit (compare p. 12 of the system description).

BRIEF SUMMARY OF THE INVENTION

The object of the present invention consists in specifying a method for executing a protected function of an electric field unit and an electric field unit, wherein, independently of the type of communication link with the electric field unit, a high standard of security against unwanted accesses is ensured.

According to the invention, this object is achieved with respect to the method by a method for executing a protected function of an electric field unit, in which the following steps are performed: the electric field unit receives command data which specify a function call for executing a protected function of the electric field unit; an identification device of the electric field unit determines sender characterization data characterizing the respective sender of the command data and appends these to the command data; a security device receives the command data extended by the sender characterization data and checks them to see whether they allow an execution of the protected function of the electric field unit specified by the command data, wherein if the permission exists, the command data are conveyed to the protected function and this function is executed and if the permission is lacking, execution of the protected function is denied.

The essential advantage of the method according to the invention consists in that a check of the authorization of the sender can be carried out independently of the type of access to the electric field unit. This is achieved by the fact that the field unit has an identification device which subjects all command data to a sender identity determination independently of the type and manner in which they have reached the field unit. This means, therefore, that sender characterization data independent of the data interface are determined from the interface-specific or protocol-specific command data. In interaction with the security device of the electric field unit which either permits or blocks an execution of the protected function of the electric field unit by means of the sender identification made by the identification device, high security of the field unit against unauthorized access to its protected functions can be achieved.

An advantageous embodiment of the method according to the invention consists in that, for determining the sender characterization data, the identification device transfers sender-specific data, designating the sender and allocated to the command data, to an identity database, the identity database determines sender characterization data corresponding to the sender-specific data, and the sender characterization data determined are returned to the identification device.

In this context, sender-specific data are those data which are conveyed to the electric field unit together with the command data and which allow a conclusion with respect to the sender of the command data in some manner. In this way, the sender of the command data can be determined in a simple manner by checking entries existing in the identity database. Similarly, the user of the field unit can perform changes in the identity database in a simple manner in order to thus record information on new senders in the database or release or block individual protected functions for certain senders.

In this context, an advantageous development provides that the identity database determines, by means of the sender-specific data, type data specifying a user type of the sender and returns these as sender characterization data to the identification device, and the security device, using these type data, checks the permission of the sender for executing the secured function.

In this context, type data are those data which do not specify the individual actual sender but a group associated with him or a type associated with him. Thus, it is not necessary to determine the actual sender himself by reading type data out of the identity database. Instead, it is sufficient if the sender is only generally allocated to a group since usually certain groups of persons accessing the electric field unit have corresponding access rights within their group. Thus, for example, it is sufficient to recognize the identity of the sender as "parameterization personnel" in order to release the functions necessary for parameterization for the sender.

An alternative development of this provides that the identity database, using the sender-specific data, determines type data specifying a user type of the sender, the identity database, using the type data, determines access right data corresponding to the user type of the sender and returns these as sender characterization data to the identification device, and the security device, using these access right data, checks the permission of the sender for executing the secured function.

In this case, it is not the security device itself which has to allocate the type data to corresponding access right data since this is handled by the identity database.

In this context, it is also considered to be an advantageous development of the method according to the invention that the identity database, using the type data, first determines role data specifying a user role of the sender, the identity database, using the role data determined, determines access right data allocated to these, and the access right data determined are returned as sender characterization data to the identification device.

In this context, role data are to be considered to be those data which specify an object range. Providing role data creates as it were an intermediate layer between the type data and the access right data, which contains role data corresponding to the type data. For example, the roles "parameterizing" and "execute unit test" can be allocated to the type "parameterizing personnel". The respective role data are in turn allocated various access right data. Inserting this intermediate layer lastly makes it possible to carry out a more comfortable parameterization of the identity database since the role data, as preset object ranges, can already be linked with matching access right data by the manufacturer and only the required type data then need to be linked to corresponding role data at the operator of the field unit for commissioning. For this purpose, only comparatively few adjustments need to be performed in the identity database.

A further advantageous development of the method according to the invention is specified by the fact that in the case of a sessionless communication link between the sender and the electric field unit, the sender-specific data contain identification data specifying a sender data processing device, and the identity database (4) allocates the sender characterization data to the identification data.

This is of advantage, in particular, in the case of communication links via an Ethernet interface with a sessionless communication protocol such as, for example, the http (Hyper Text Transfer Protocol) normally used in the Internet. The sender-specific data here contain identification data which characterize the sender data processing device. Using these identification data, the identity database can check whether the sender data processing device is trusted and to which user type the sender data processing device is allocated. Thus, an identification of the sender data processing device can occur without great expenditure. For example, the identification data can consist of a MAC address of the sender data processing device. Using the MAC address, the identity database recognizes the user type of the sender.

As an alternative, a further advantageous embodiment is given by the fact that in the case of a session-based communication link between the sender and the electric field unit, the sender-specific data contain key data of the sender and the identity database allocates the sender characterization data to the key data.

In this context, key data are data which contain a coding key as is used, for example, for electronic encryption. In this way, the identity database can identify the sender in a simple manner, in a session-based communication link according to, for example, the https protocol (hyper text transfer protocol secure) by means of key data such as, for example, a public key of the sender.

In this context, it is also considered to be advantageous if the communication link is established between an external passive data storage module and the electric field unit and the key data are transferred from a memory area in the external passive data storage module to the identification device.

In this way, it is also possible, for example, to establish a communication link between a USB stick as external passive data storage module and the field unit. In this arrangement, the key data are transferred from the USB stick to the identification device. The field unit is operated in this case via the local keypad of the field unit, only the sender recognition is performed by means of the key on the USB stick.

According to a further alternative embodiment of the method according to the invention, it can also be provided that in the case of a communication link between the sender and the field unit, set up by means of an input device at the field unit, the sender-specific data contain password data input by the sender. In this manner, a user operating directly at the unit can also be identified in a simple manner.

With respect to the field unit, the object mentioned above is achieved by an electric field unit comprising at least one data interface via which a communication link can be established for transferring command data for executing a secured function of the electric field unit, in which the data interface is connected to an identification device, the identification device being arranged in such a manner that it adds sender characterization data specifying a sender of the command data to the command data received by the interface, and the identification device is connected to a security device, the security device being arranged in such a manner that it checks the command data, extended by the sender characterization data, for a permission to execute the secured function of the electric field unit and allows an execution of the secured function only when the permission exists.

The interaction between the identification device and the security device ensures in this case a high degree of security against unwanted third-party accesses.

In this context, an advantageous embodiment of the electric field unit according to the invention is given by the fact that the identification device has an identity database which is arranged in such a manner that it determines the sender characterization data by means of sender-specific data contained in the command data. Providing the identity database makes it possible to comparatively flexibly and simply adapt the identification device to the situations prevailing at the operator of the electric field unit.

A further advantageous embodiment of the electric field unit according to the invention finally provides that the data interface is an Ethernet interface, a USB interface or a serial interface. These data interfaces can operate, e.g., in accordance with a so-called master-slave protocol, a point-to-point protocol (PPP) or a network-capable protocol (IP-based protocol). Such interfaces are particularly widely used for transmitting electronic communication data close-by and remotely.

To provide a further explanation of the invention,

DESCRIPTION OF THE INVENTION

Figure 1:
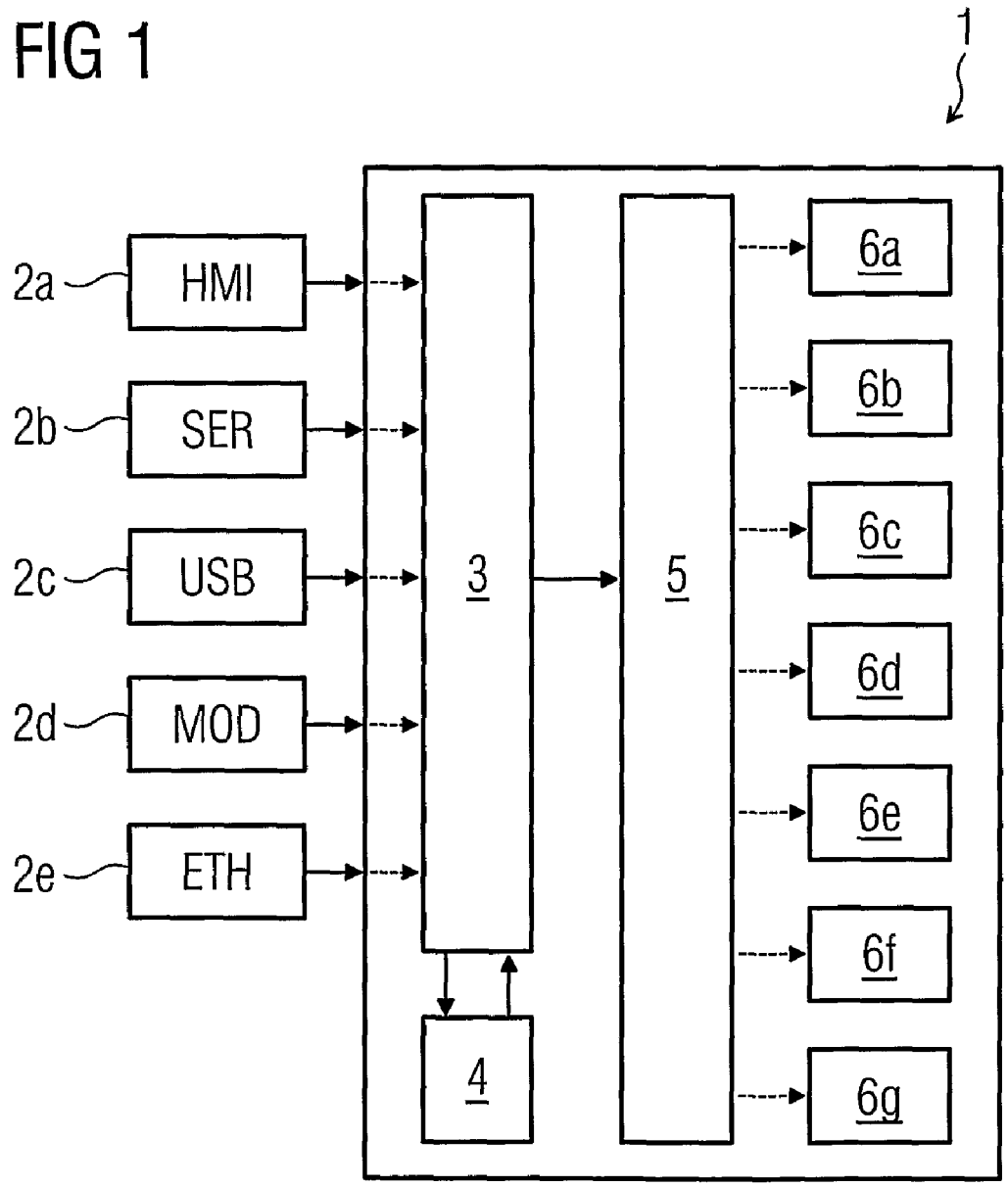
FIG. 1 shows in a diagrammatic block diagram an electric field unit.

FIG. 1 shows in a diagrammatic representation a block diagram of an electric field unit 1. The electric field unit 1 can be, e.g., a component of an automation system for controlling and regulating the distribution of electrical energy in an energy supply network. The field unit 1 has data interfaces 2a to 2e, the data interface 2a representing a so-called human-machine interface (HMI), that is to say an input device provided locally at the electric field unit such as a keypad and an output or display device such as a display. In this context, the data interfaces 2a-2e do not only contain the purely physical interface but also the information-related data link such as, e.g., the data abstraction levels up to level 4 of the known OSI layer model (open systems interconnection reference model) allocated to the respective data interface.

The data interface 2b is shown in FIG. 1 as serial interface to which a serial data transmission line can be connected. The data interface 2c is a USB (universal serial bus) interface provided at the electric field unit for connecting a USB data transmission line. Further devices such as, for example, a laptop, can usually be connected to the electric field unit via the serial interface 2b and the USB interface 2c by means of a comparatively short cable link. In this arrangement, the USB interface is designed for a distinctly higher data transmission rate than the serial interface which, for example, operates in accordance with the RS 232 standard. Furthermore, apart from active electric devices such as a laptop, passive data memories such as, for example, a USB stick, can also be connected to the electric field unit via the USB interface.

The data interface 2d represents a data link for connecting a modem, such a modem allowing remote access to the electric field unit. In principle, the data interface 2d can be designed as any electric communication interface which allows a modem to be connected. For example, the data interface 2d can also be a serial interface or a USB interface.

The data interface 2e, finally, represents an Ethernet interface via which the electric field unit can be linked into a data network according to the Ethernet standard. This makes it possible to connect the electric field unit, for example, to a company intranet or even the Internet. The electric field unit 1 can also be linked into a network of field units, for example according to the International standard IEC 61850 via the Ethernet interface 2e.

The electric field unit also has an identification device 3 which is connected to an identity database 4. The identification device 3 is also connected to a security device 5. Following the security device 5, different unit function modules 6a to 6g are shown in a highly diagrammatic representation. These function modules 6a to 6g represent basic functions of the electric field unit 1, for example a read function of electrical parameters set in the electric field unit 1 or a switching function for opening or closing a circuit breaker connected to the electric field unit. The identification device 3, the identity database 4, the security device 5 and the unit function modules 6a to 6g will usually not be present as separate electrical modules in the electric field unit 1 but, instead, arranged as program modules or equipment software.

The interaction between the identification device 3, the identity database 4 and the security device 5 ensures that protected functions of the electric field unit 1 can only be executed by authorized users independently of the electrical data interface 2a to 2e via which a user sets up a communication link with the electric field unit 1. In the text which follows, this will be explained by means of the five data interfaces shown by way of example in FIG. 1.

Firstly, a method for executing a protected function of the electric field unit 1 is considered when the user of the electric field unit accesses the electric field unit via the local input device, that is to say via the data interface 2a. For this purpose, the user uses a keypad provided at the electric field unit and a display for calling up various functions of the electric field unit. These functions are usually arranged in so-called function menus, to provide simpler clarity, as are known today from the most varied application programs in the computer field. Using the keypad, the user can navigate through the function menus displayed on the display of the electric field unit and select functions of the electric field unit which are to be executed. If the user selects a protected function of the electric field unit such as, for example, opening an electrical circuit breaker, the electric field unit will request him to input a password which authorizes him to carry out this protected function. The user inputs the corresponding password via the keypad which is attached as sender-specific data to the command data which specify the function call of the protected function of the electric field unit. The identification device receives the command data with the sender-specific data in the form of the password data and transfers these password data to the identity database 5. Using the password data, the identity database 5 determines sender characterization data which identify the sender of the command data, that is to say the user active at the keypad of the electric field unit. These sender characterization data are returned to the identification device 3. The identification device 3 appends the sender characterization data to the command data for calling up the protected function of the electric field unit 1 and transfers this record to the security device 5. The security device 5 checks whether the sender characterization data conveyed with the command data allow execution of the required protected function of the electric field unit 1, that is to say, in this case, whether the user active at the electric field unit is authorized for opening the circuit breaker. If the security device 5 determines a positive result, i.e. the user is authorized for executing the protected function, it transfers the function call to the corresponding function module with the required protected function of the electric field unit 1, for example the function block 6d. The corresponding function of the electric field unit 1 is then executed. If, however, the security device 5 determines that the sender characterization data do not allow execution of the required protected function of the electric field unit 1, i.e. the user is not authorized to execute the protected function of the electric field unit 1, it denies execution of the required protected function of the electric field unit 1. In this case, the circuit breaker, in consequence, is not opened via the function block 6d.

In the second case to be considered, a communication link is established between the user of the electric field unit 1 and the electric field unit 1 via the serial data interface 2b. For example, a serial data cable can be connected to the serial interface 2b which is connected at its other end to an external data processing device, for example a laptop. The user now no longer enters function calls locally at the electric field unit 1 via the keypad but uses for this purpose the laptop connected via the serial data interface 2b. For example, he can transfer via the laptop a function call to the electric field unit by means of which certain security-related parameters of the electric field unit are to be changed. In this case, the method would proceed similarly to the method described above with respect to the local data interface. The user at the laptop would be requested again to input a password by means of which his identity can be recognized. The security device 5 can then be used for checking whether the user is authorized for executing the required protected function of the electric field unit 1, that is to say changing the security-related parameters of the electric field unit 1, in this case. The corresponding function is only executed in the case of a positive result of the check and the parameter adjustments of the unit are changed.

Analogously, in the case of electric field units which have a USB interface, a laptop could also be connected to the electric field unit via the USB interface 2c and transmit the function call for executing the protected function of the electric field unit via this interface. In this case, the method would proceed, in principle, similarly to the serial interface described.

A further possibility for using the USB interface 2c at the electric field unit 1 also consists in that the user of the electric field unit sets up a communication link via the local data interface, that is to say the keypad and the display, but additionally connects a passive data storage module such as a USB stick to the electric field unit via the USB interface. In this context, the USB stick can contain key data as sender-specific data which are transmitted to the identification device 3 instead of the password data. Using these key data, the identification device 3, in interaction with the identity database 4, can determine the identity of the sender. However, the further method would proceed analogously; the identity database 4 would therefore determine by means of the sender-specific data in the form of the key data sender characterization data for identifying the sender of the command data and transmit these together with the command data to the security device 5. The latter, in turn, checks whether the sender characterization data authorize execution of the required protected function of the electric field unit 1.

Via the data interface 2d, a modem can be connected to the electric field unit 1 via which remote access to the electric field unit 1 is made possible. In principle, such remote access can occur similarly to a local access to the electric field unit 1 via the serial data interface 2b or via the USB interface 2c. In this case, password data or key data would again be transmitted to the identification device 3 as sender-specific data. Depending on the type of communication protocol used in the communication link, however, identification data which identify a sender data processing device can also be transmitted as user-specific data to the identification device 3.

This will be explained in greater detail in conjunction with the Ethernet data interface 2e of the electric field unit 1. Via the Ethernet data interface 2e, the electric field unit 1 will usually be accessed remotely. However, it is also possible to connect a sender data processing device locally to the electric field unit via a comparatively short Ethernet communication cable. When the electric field unit 1 is accessed via the Ethernet data interface 2e, a distinction must be made, in particular, between two types of communication links, namely the session-based communication link and the sessionless communication link.

Currently, the sessionless communication links via Ethernet interfaces are still the most widely used. They occur, for example, in accordance with the http communication protocol known from Internet technology. Sessionless means in this context that no fixed communication channel is established between the sender of the command data and the receiver, that is to say the electric field unit. A sessionless communication link can be compared, for example, with a mail consignment. In this case, the command data are packaged in an envelope, as it were, which is addressed to an addressee, in this case the electric field unit. The addressee is determined, for example, via a so-called IP address or a MAC address of the receiver device. In addition, sender-specific data in the form of identification data which identify the sender of the command data in the envelope are specified on the envelope. For example, these identification data can specify a MAC address of the sender data processing device in the case of a sessionless communication link. Using the identification data, the identification device 3 and the identity database 4 can determine the identity of the sender or, respectively, the identity of the sender data processing device. If the sender data processing device is graded as trustworthy (which would be the case, for example, if the sender data processing device is an operating station in a control room for controlling the electrical energy supply network, entered in the identity database), corresponding sender characterization data are transmitted by the identity database 4 to the identification device 3 and, using these sender characterization data, the security device 5 can allow access to a corresponding protected function of the electric field unit. If the identification data of the sender data processing device are not recognized by the identity database 4 or they are considered to be untrustworthy, no or corresponding other sender characterization data are appended to the command data and the security device 5 will deny access to the protected function of the electric field unit 1.

In the other case of a session-based communication link, a fixed communication channel is established between the sender and the electric field unit 1. This is comparable, for example, with a telephone call between two communication partners via an analog telephone line. In this context, sender-specific data in the form of key data are transmitted together with the command data at the beginning of the communication setup, by means of which the identity database 4 can determine the sender characterization data for identifying the sender. The further method proceeds as described with respect to the other data interfaces 2a to 2d.

In the text which follows, it will be described by means of FIGS. 2 and 3 how the identity database 4 can determine the sender characterization data by means of the sender-specific data.

Figure 2:
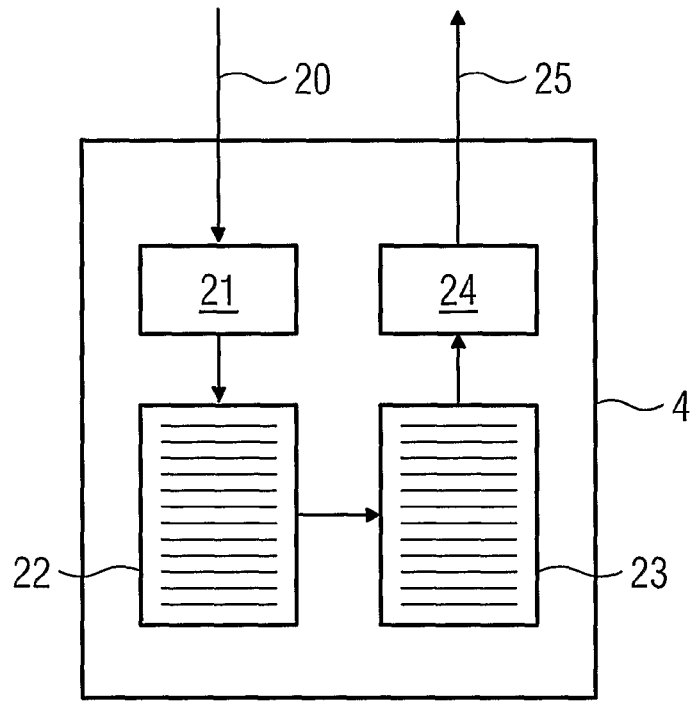
FIG. 2 shows a first exemplary embodiment of an identity database.

In this context, FIG. 2 shows a diagrammatic representation of the identity database 4. The sender-specific data are transferred, via an incoming arrow 20, from the identification device 3 to the identity database 4. The identity database 4 receives the sender-specific data via a data input port 21. The identity database 4 determines the sender specified by the sender-specific data in accordance with a first allocation table 22 stored in the identity database 4. This can lead to an accurate identification of the person of the sender. In such a case, an entry must be provided for each possible user of the electric field unit 1 in the identity database 4 and each possible user of the electric field unit must have his own sender-specific data. Usually, however, it is sufficient to determine only a user type of the sender. For example, a user type can mean "parameterization personnel" of the electric field unit. In this case, all persons who are usually allowed to handle parameterization tasks of the electric field unit would be allocated to the user type "parameterization personnel". Other possibilities of user types are, for example, "reading personnel" who are allowed to read measurement values and settings of the electric field unit but cannot change these, and "commissioning personnel" who are allowed to change all settings on the electric field unit but cannot perform any switching actions with the electric field unit. It is sufficient in this context if all persons belonging to a user type convey the same sender-specific data with the command data to the electric field unit and the user type of the sender is determined only by means of a single entry in the identity database 4. A more accurate identification of the sender is not necessary—as mentioned above. This distinctly shortens, in particular, the commissioning phase of the electric field unit since considerably fewer entries need to be made in the identity database 4.

According to the example shown in FIG. 2, type data which specify the user type of the sender would thus be allocated to the sender-specific data arriving via the data input port 21 by means of the first allocation table 22. The identity database allocates these type data to the access right data allowed for this user type in accordance with a second allocation table 23. The access right data in each case specify those unit functions of the electric field unit 1 which the respective user type is allowed to perform. For example, access right data which correspond to unit functions such as "reading out unit parameters", "changing unit parameters", "storing unit parameters", "testing unit parameters" would have to be allocated to the user type "parameterization personnel". For a user type "operating personnel", for example, access right data for the unit functions "perform switching action (opening) at the circuit breaker" and "perform switching action (closing) at the circuit breaker" would be provided.

The access right data determined in accordance with the second allocation table 23 are returned to the identification device 3 along arrow 25 via a data output port 24. The security device 5 which follows the identification device 3 can carry out the check with respect to the authorization for performing the protected function by means of these access right data.

In the example according to FIG. 2, it should also be mentioned that there is also the possibility that, by means of the identity database, only type data specifying the user type are determined by means of the first allocation table 22 and these type data are transferred to the identification device 3 and the security device 5 via the data output port 24. In this case, the security device 5 would have to have an allocation table corresponding to the second allocation table 23 which allocates the corresponding access right data to the type data determined.

Figure 3:
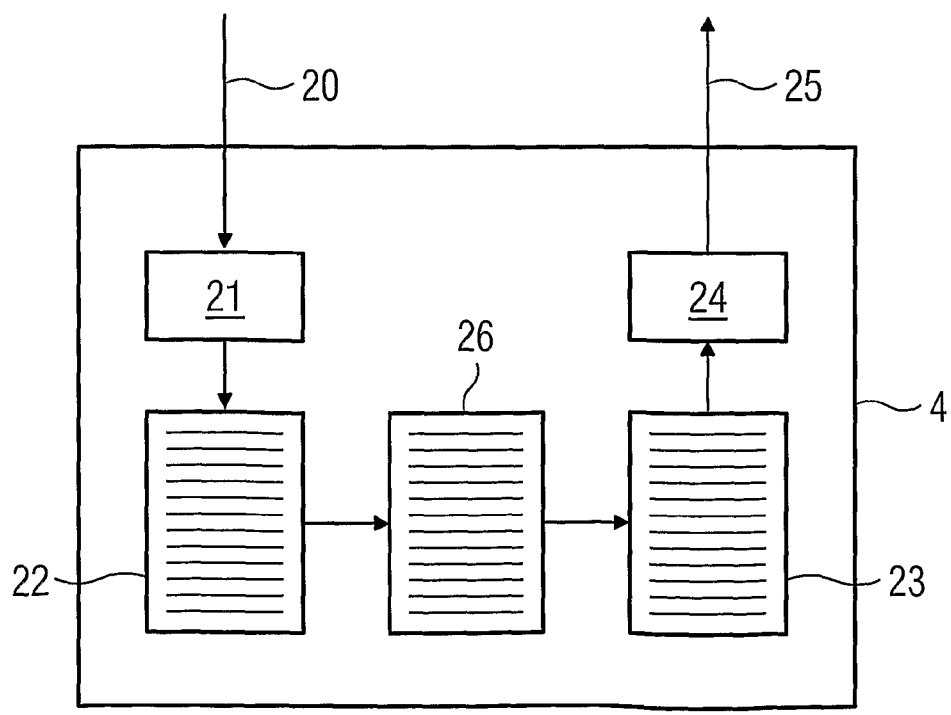
FIG. 3 shows a second exemplary embodiment of an identity database.

FIG. 3 shows an alternative possibility to FIG. 2 for the way in which the sender characterization data can be determined by means of the identity database. FIG. 3 essentially corresponds to FIG. 2. For this reason, the corresponding components of FIGS. 2 and 3 are also identified with the same reference symbols. Analogously to FIG. 2, the sender-specific data are transferred from the identification device 3 along arrow 20 to the identity database 4. These data are received by the identity database 4 with the input data port 21. Using the first allocation table 22, type data specifying the user type of the sender are allocated to the sender-specific data.

However, role data are now first allocated to these type data in an intermediate allocation table 26. Role data specify the user roles normally represented by the corresponding user type. In other words, the role data specify the object ranges normally to be performed by the corresponding user type. Thus, for example, the object ranges "parameterizing" and "testing" can be allocated to the user type "parameterization personnel". The user type "operating personnel" would be allocated, for example, the role data "perform switching action" and "read out measurement values". The more finely granulated access right data are only allocated by means of the second allocation table 23 to these role data thus determined. For example, to the role data "perform switching action" would be allocated the access right data "perform switching action (opening) of the circuit breaker" and "perform switching action (closing) of the circuit breaker".

The access right data determined in this manner are transferred as sender characterization data via the data output port 24 of the identity database 4 to the identification device 3 analogously to FIG. 2. The advantage of the exemplary embodiment according to FIG. 3 lies in the fact that an extensive preconfiguration of the identity database 4 can be performed already by the manufacturer of the electric field unit. Thus, corresponding access right data which, in turn, are divided into corresponding object ranges by means of the second allocation table 23 and are thus allocated to the corresponding role data can be allocated already namely to all unit functions. Lastly, it is only necessary to agree corresponding user types with the operator of the electric field unit and to allocate corresponding role data to these user types in accordance with the intermediate allocation table 26. This noticeably shortens the configuration phase at the operator of the electric field unit. Since such configuration phases are usually associated with very great expenditure, considerable costs can be saved by the preconfiguration at the manufacturer.

Figure 4:
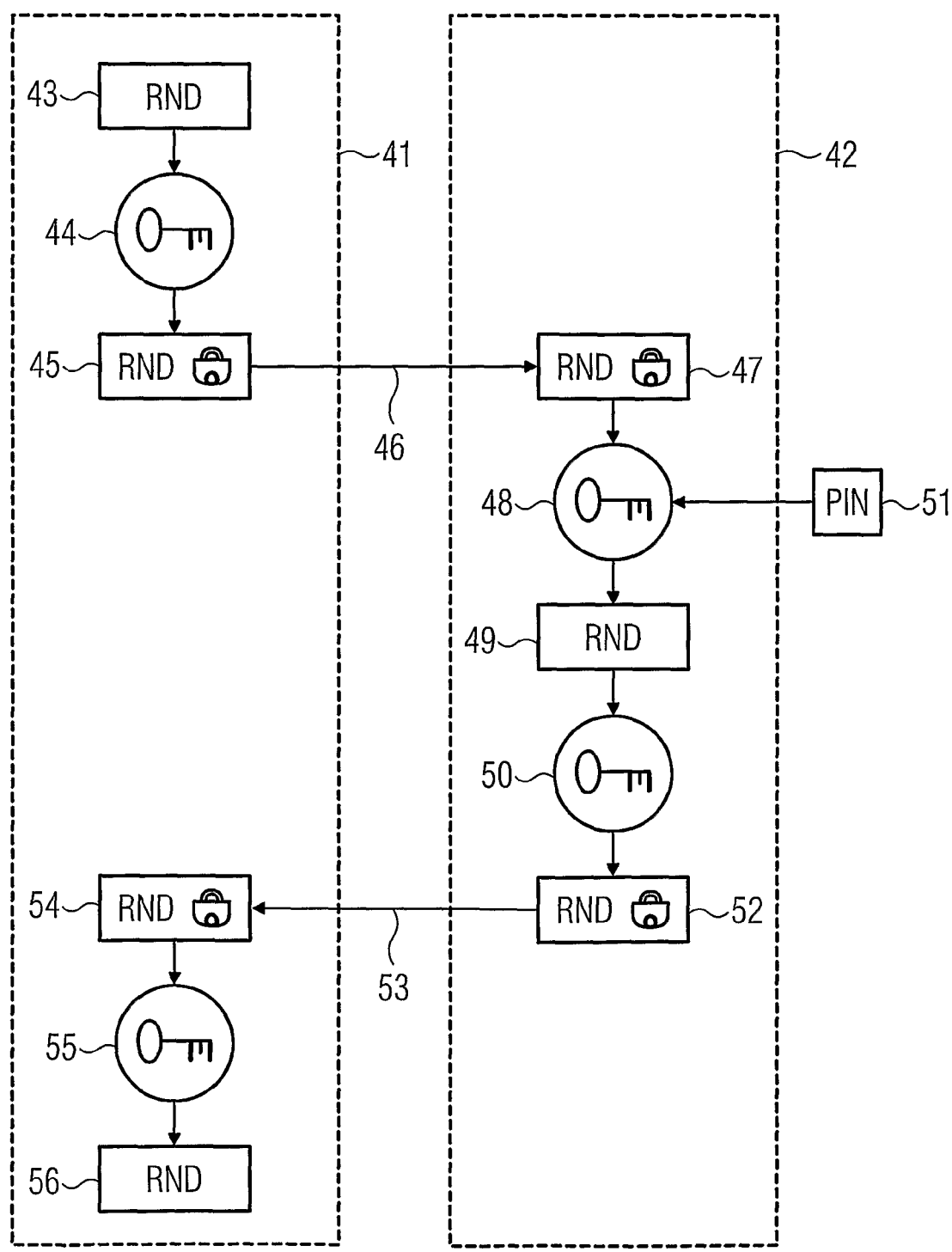
FIG. 4 shows a diagrammatic traffic flow pattern for explaining an identification of a sender in the case of a session-based communication link.

Finally, FIG. 4 will be used for explaining how the identity of the sender can be determined in a session-based communication link. For this purpose, so-called certificates are used which provide for a signature of the command data.

For example, the certificate X.509 in the currently used version 3 or a higher version can be used which is known from electronic encryption technology. In this case, the certificate contains three keys: one pair of keys of the user consisting of a public key of the user, known also to the field unit, and a private key of the user, known only to the user, and a public certificate key for specifying the authenticity of the certificate.

The electric field unit first checks by means of a public certificate key which is transferred together with the command data whether it has been issued by the same certification station as a certificate provided in the electric field unit. Using this public certificate key, a check is made whether the sender has been authorized by the certification station specified for the field unit 1 (or an entire automation system, the component of which the field unit 1 is), that is to say whether the sender can be graded as trustworthy. If the sender has been recognized as trustworthy in this context, a check is made whether the sender is actually identical with the certificate owner. For this purpose, the public key of the certificate allocated to the sender is used. For this purpose, the sender needs the private certificate key for the certificate accessible only to the certificate owner. The sender is requested, therefore, to sign an arbitrary text, e.g. a random character sequence, with his private certificate key. The validity of this signal can then be checked with the public key of the certificate.

In the text which follows, this procedure is explained in greater detail with reference to FIG. 4.

The method shown in FIG. 4 is performed for the reliable identification of the sender of the command data and for forming a secure communication channel. In this context, a first box 41 represents the events in the electric field unit and a second box 42 represents the events at the sender data processing device at the user of the electric field unit.

In a first step 43, a random character sequence RND is generated by the electric field unit and encrypted with a public key of the user of the field unit. This is done in step 44. In step 45, the encrypted random character sequence RND is present in the electric field unit. As indicated by the arrow 46, it is transferred to the sender data processing device. In step 47, the encrypted random character sequence is present on the sender data processing device of the user and is decrypted in step 48 with the aid of the private key, stored on the sender data processing device, belonging to the public key of the electric user. This requires an input of a code character sequence by the user of the sender data processing device. This is indicated in step 51. By inputting the code character sequence or also PIN (personal identity number) the use of the private key of the user is activated, as it were. In step 49, the now decrypted random character sequence RND is present in the sender data processing device.

This is now encrypted again with the aid of the public key of the electric field unit which is known to the user or has been conveyed, for example, together with the command data, in step 50. The random character sequence RND is present in reencrypted form on the sender data processing device in step 52.

In step 53, this reencrypted random character sequence RND is transferred back to the electric field unit and is present on the electric field unit in step 54. In step 55, the random character sequence is decrypted, using the private key of the field unit. Finally, the random character sequence is present again in decrypted form on the electric field unit in step 56 and can be compared with the initial random character sequence according to step 43. If the two random character sequences match, the sender has been unambiguously identified and a secure communication link has been established between the electric field unit and the user. The random character sequence can be used for encrypting the data exchanged between the sender and the electric field unit.

The electric field unit has now determined the identity of the user, by means of the public certificate key of the user which is transmitted together with the command data, and verified the identity by means of the subsequent check by means of the random character sequence. The further method proceeds analogously to the procedure described above.

Finally, it should be mentioned that the certificate with the corresponding keys of the user can also be present, instead of on a sender data processing device, for example on a USB stick of the user which is connected to the electric field unit via the USB interface. In this case, the user would set up a communication link with the electric field unit via the local input device and the display at the electric field unit as already mentioned. Instead of the input of password data, however, the electric field unit would interrogate the certificate on the USB stick and a secure communication link would be set up, as it were, between the electric field unit and the user by using the certificate stored on the USB stick analogously to the method represented in FIG. 4 and explained above. Inputting the PIN for activating the private key according to step 51 would in this case also be performed by the user directly via the input keyboard at the electric field unit. This has the advantage that the user does not need to memorize various password data but only the sequence of coding symbols or PIN belonging to the corresponding USB stick.

The invention claimed is:

1. A method of executing a protected function of an electric field unit, which comprises the following steps:
   receiving, in the electric field unit, command data specifying a function call for executing a protected function of the electric field unit;
   determining, with an identification device of the electric field unit, sender characterization data characterizing a respective sender of the command data and appending the sender characterization data to the command data to form appended command data;
   receiving the appended command data in a security device of the electric field unit and checking the appended command data to see whether or not an execution of the protected function of the electric field unit specified by the command data is allowed and permission should be granted; and
   if permission is granted, conveying the command data to the protected function and executing the function by the electric field unit;
   if permission is not granted, denying execution of the protected function;
   in case of a session-based communication link between the sender and the electric field unit, the sender-specific data contain key data of the sender; and the identity database allocates the sender characterization data to the key data, wherein
   for forming a secure communication channel between a data processing device of the sender of the communication data and the electric field unit:
   a random character sequence is generated by the electric field unit and encrypted with a public key of the sender;
   the encrypted random character sequence is transferred to the data protection device of the sender;
   the encrypted random character sequence is decrypted with a private key of the sender by the data protection device of the sender;
   the decrypted random character sequence is reencrypted with a public key of the electric field unit;
   the reencrypted random character sequence is transferred back to the electric field unit;
   the random character sequence is decrypted with a private key of the electric field unit by the electric field unit;
   the decrypted random character sequence is compared with the initial random character sequence; and
   the secure communication channel is established when the two random character sequences match.

2. The method according to claim 1, wherein the determining step comprises:

transferring with the identification device sender-specific data, designating the sender and allocated to the command data, to an identity database;

determining with the identity database the sender characterization data corresponding to the sender-specific data; and returning the thus-determined sender characterization data to the identification device.

3. The method according to claim 2, wherein:

the identity database determines, by way of the sender-specific data, type data specifying a user type of the sender and returns the type data as sender characterization data to the identification device; and the security device, using the type data, checks the permission of the sender for executing the protected function.

4. The method according to claim 2, wherein:

the identity database, using the sender-specific data, determines type data specifying a user type of the sender;

the identity database, using the type data, determines access right data corresponding to the user type of the sender and returns the access right data as sender characterization data to the identification device; and the security device, using the access right data, checks the permission of the sender for executing the protected function.

5. The method according to claim 4, wherein:

the identity database, using the type data, first determines role data specifying a user role of the sender;

the identity database, using the role data, determines access right data allocated to the role data; and the access right data are returned to the identification device as sender characterization data.

6. The method according to claim 2, wherein:

in case of a sessionless communication link between the sender and the electric field unit, the sender-specific data contain identification data specifying a sender data processing device; and the identity database allocates the sender characterization data to the identification data.

7. The method according to claim 6, which comprises using a MAC address of the sender data processing device as identification data.

8. The method according to claim 2, wherein:

in case of a session-based communication link between the sender and the electric field unit, the sender-specific data contain key data of the sender; and the identity database allocates the sender characterization data to the key data.

9. The method according to claim 8, which comprises:

establishing the communication link between an external passive data storage module and the electric field unit; and transferring the key data from a memory area in the external passive data storage module to the identification device.

10. The method according to claim 2, wherein, in case of a communication link between the sender and the field unit set up by way of an input device at the electric field unit, the sender-specific data contain password data input by the sender.

11. An electric field unit, comprising:

at least one data interface for establishing a communication link for receiving command data for executing a protected function of the electric field unit;

an identification device connected to said at least one data interface, said identification device being configured to add sender characterization data characterizing a sender of the command data to the command data received by said data interface;

a security device connected to said identification device, said security device being configured to check the command data, with the sender characterization data added thereto, for permission to execute the protected function of the electric field unit and to allow an execution of the secured function only if permission exists; and an identity database;

in case of a session-based communication link between the sender and the electric field unit, sender-specific data includes key data of the sender, and the identity database being configured to allocate the sender characterization data to the key data;

wherein, for forming a secure communication channel between a data processing device of the sender of communication data and the electric field unit:

the electric field unit is configured to generate an initial random character sequence and encrypt the initial random character sequence with a public key of the sender;

the electric field unit is configured to transfer the initial random character sequence to a data protection device of the sender to be processed by the data protection device of the sender;

the electric field unit is configured to receive a re-encrypted random character sequence from the sender;

the electric field unit is configured to decrypt the re-encrypted random character sequence from the sender with a private key of the electric field unit;

the electric field unit is configured to compare the decrypted random character sequence with the initial random character sequence; and the electric field unit is configured to establish the secure communication channel when the two random character sequences match.

12. The electric field unit according to claim 11, wherein said identification device includes an identity database configured to determine the sender characterization data by way of sender-specific data contained in the command data.

13. The electric field unit according to claim 11, wherein said data interface is an Ethernet interface, a USB interface, or a serial interface.

14. A method of executing a protected function of an electric field unit, which comprises the following steps:

receiving, in the electric field unit, command data specifying a function call for executing a protected function of the electric field unit;

determining, with an identification device of the electric field unit, sender characterization data characterizing a respective sender of the command data and appending the sender characterization data to the command data to form appended command data;

receiving the appended command data in a security device of the electric field unit and checking the appended command data to see whether or not an execution of the protected function of the electric field unit specified by the command data is allowed and permission should be granted;

if permission is granted, conveying the command data to the protected function and executing the function by the electric field unit; and if permission is not granted, denying execution of the protected function, wherein the determining step comprises:

transferring with the identification device sender-specific data, designating the sender and allocated to the command data, to an identity database;

determining with the identity database the sender characterization data corresponding to the sender-specific data; and returning the thus-determined sender characterization data to the identification device, wherein in case of a session-based communication link between the sender and the electric field unit, the sender-specific data contain key data of the sender;

and the identity database allocates the sender characterization data to the key data, wherein for forming a secure communication channel between a data processing device of the sender of the communication data and the electric field unit a random character sequence is generated by the electric field unit and encrypted with a public key of the sender;

the encrypted random character sequence is transferred to the data protection device of the sender;

the encrypted random character sequence is decrypted with a private key of the sender by the data protection device of the sender;

the decrypted random character sequence is reencrypted with a public key of the electric field unit;

the reencrypted random character sequence is transferred back to the electric field unit;

the random character sequence is decrypted with a private key of the electric field unit by the electric field unit;

the decrypted random character sequence is compared with the initial random character sequence; and the secure communication channel is established when the two random character sequences match.

15. The method according to claim 14, wherein the random character sequence is used for encrypting the data exchanged between the sender and the electric field unit.

* * * * *